UNITED STATES PATENT OFFICE.

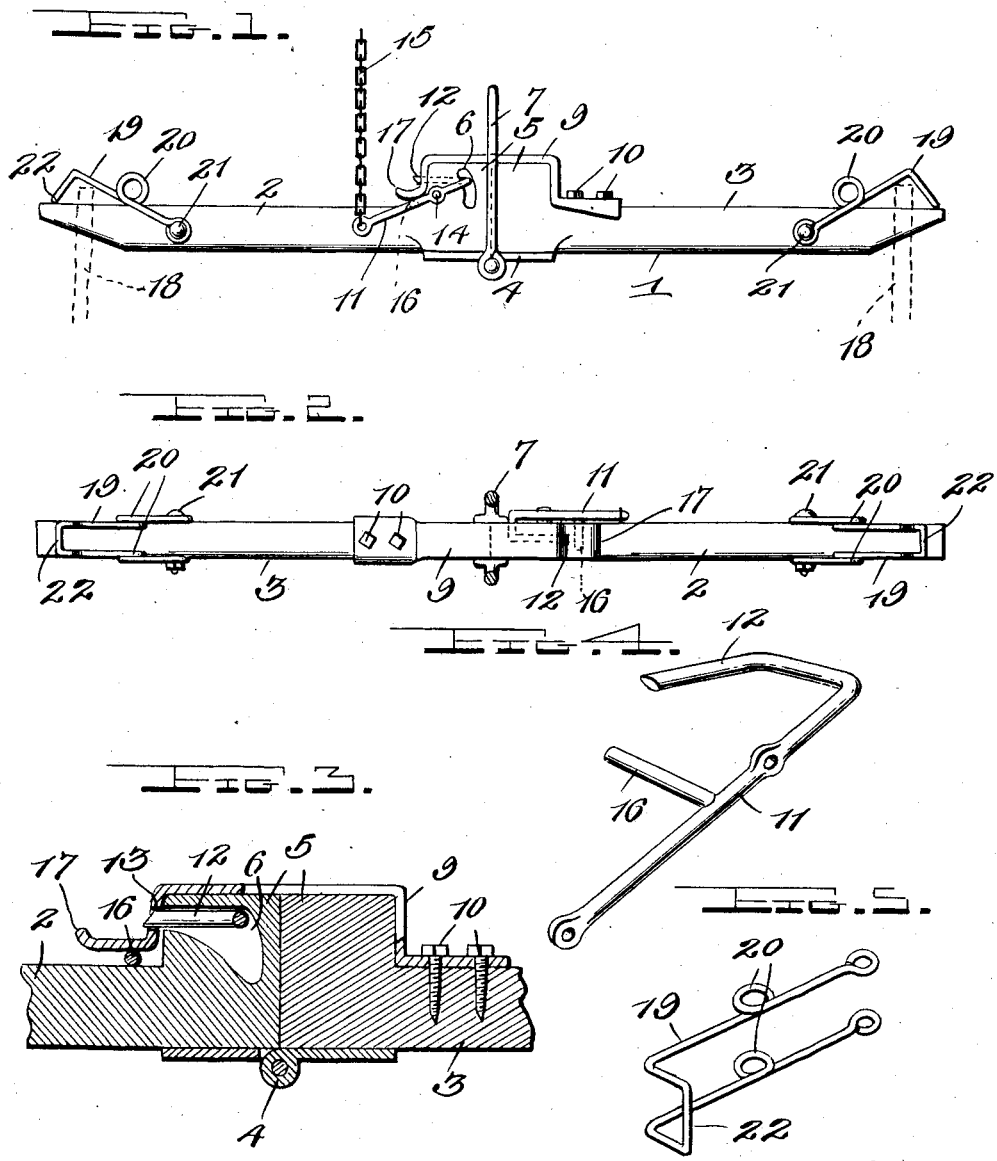

JAMES R. BURLESON, OF McGREGOR, TEXAS.

HORSE-RELEASER.

1,037,860. Specification of Letters Patent. Patented Sept. 10, 1912.

Application filed June 26, 1912. Serial No. 706,106.

*To all whom it may concern:*

Be it known that I, JAMES R. BURLESON, a citizen of the United States, residing at McGregor, in the county of McLennan and State of Texas, have invented certain new and useful Improvements in Horse-Releasers, of which the following is a specification, reference being had to the accompanying drawings.

This invention relates to new and useful improvements in horse releasers, the object of the invention being to provide a device of this character whereby the draft animals may be quickly and easily released from the vehicle if they should become frightened and the driver lose control over them, thus avoiding any serious accident to the vehicle or the persons therein.

Another object of the invention is to provide a horse releaser of the above character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claim and shown in the accompanying drawings in which, Figure 1 is a plan view of a horse releaser constructed in accordance with my invention. Fig. 2 is a rear edge view. Fig. 3 is a detail longitudinal sectional view. Fig. 4 is a detail perspective view of the releaser member and Fig. 5 is a detail perspective view of one of the trace holding members.

In carrying out my invention it will be readily understood that the device, while herein shown and described as applied to a swingle tree, can be just as readily applied to a double tree.

Referring more particularly to the drawings in detail, 1 indicates a swingle tree which is formed in two sections, as shown at 2 and 3, which are hingedly connected together by means of the hinge 4 at the intermediate portion of the swingle tree. The inner ends of the sections 2 and 3 are provided with the enlarged portions 5 so as to strengthen the same at their pivot connection. One of the enlarged portions 5 is provided with a transverse recess extending inwardly one half of the width of the swingle tree, the recess then extends longitudinally, opening out upon the outer side of the enlarged portion, thus forming an angular opening 6 in said enlarged portion.

The swingle tree is suitably connected to the vehicle by means of a U-shaped clevis 7, having its ends arranged upon the opposite sides of the swingle tree and mounted upon the ends of the hinge pintle, said clevis being connected to the vehicle in any suitable manner. It will be understood that any suitable form of connecting means may be used in place of the chain. Mounted upon the swingle tree is an angular plate 9 having one of its ends rigidly secured to the section 3 of the swingle tree as shown at 10, said plate extending across the meeting ends of the sections and having its other end engaged over the enlarged portion formed on the section 2 thus holding the sections 2 and 3 against movement.

A locking member is provided which comprises a rod 11 having one of its ends bent angularly out of the plane of the body of the rod as shown at 12. The end 12 of the locking member is arranged within the opening 6, the extreme end of said rod being disposed through an opening 13 formed in one end of the locking plate 9 so as to hold the same securely in place. The body of the rod is pivotally mounted upon the top of the swingle tree as shown at 14 and is connected at its other end, by means of the chain 15, to suitable actuating mechanism (not shown) which may be located in any convenient part of the vehicle near the driver's seat. Formed integral with the body portion of the rod 11 and extending at right angles thereto is a releasing member 16 which, when the plate 9 is in a locked position, is disposed beneath the curved end 17 of the plate so that when pulling power is applied to the chain 15, the end of the plate 9 is released, thus allowing the two sections 2 and 3 to swing inwardly toward each other so that the traces may be released from the outer ends thereof.

The traces 18 are held securely in place upon the outer ends of the swingle tree by means of the resilient retaining members 19. The retaining members 19 comprise a single length of wire bent twice at right angles intermediate of its length, the ends of said wire being bent to form the spring loops 20, and having eyes formed upon their extreme outer ends and disposed upon opposite sides of the swingle tree and pivotally secured by means of the transversely extending bolt 21. The intermediate portions of the retaining members are bent substantially at right angles as shown at 22 so that the free end of the retaining member engages the end of the swingle tree to prevent the traces from becoming detached.

In the use of my improved releaser, it will be readily apparent that when the draft animals become frightened, the driver pulls upon the chain 15 which in turn will release the end 17 of the plate 9 so as to allow the sections of the swingle tree to swing inwardly toward each other and permit the traces 18 to be drawn off from the outer ends of the swingle tree.

From the above description taken in connection with the accompanying drawings, it will be readily apparent that I have provided a simple and durable horse releaser which will be inexpensive to manufacture and at the same time will permit of the quick detachment of the draft animals from the vehicle.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

The combination with a swingle tree comprising two pivotally connected sections having trace retaining means carried by the outer ends thereof, said sections being provided at their inner ends with enlarged portions, one of which is provided with an angular opening, an angular locking plate having one end rigidly secured to one of said sections and having its intermediate portion disposed across the meeting ends of the sections, the free end of said plate being engaged over the enlarged portion on the other of said sections, a retaining member comprising a rod having one end bent angularly out of the plane of the body portion and arranged within the opening in one of the enlarged portions, said rod being pivotally secured to said enlarged portion and having its angularly bent end normally disposed in an opening in the free end of the locking plate, a releasing member formed integral with the body of the rod and extending at right angles thereto, said releasing member being normally disposed beneath the free end of the locking plate and means secured to the outer end of said rod for actuating the same and releasing the locking plate.

In testimony whereof I hereunto affix my signature in the presence of two witnesses.

JAMES R. BURLESON.

Witnesses:
J. S. HALLEY,
W. A. HAMILTON.

---

Copies of this patent may be obtained for five cents each, by addressing the "Commissioner of Patents, Washington, D. C."